United States Patent [19]

Alexandrov et al.

[11] 3,787,007

[45] Jan. 22, 1974

[54] DEVICE FOR DRIVING TRAINS OF CONTAINERS THROUGH PIPELINE

[76] Inventors: Adolf Moritsovich Alexandrov, Federatinvy prospekt, 6, korpus 3, kv. 8, Moscow; Ruben Dzhangirovich Balaian, Ljubertsy, Volkovskaya ulitsa, 9, kv. 31, Moskovskaya Oblast; Ippolit Davidovich Suladze, Prospekt Chavchavadze, 11, kv. 41, Tbilisi; Vladimir Efimovich Aglitsky, Zatsepsky val, 6/13, kv. 61, Moscow; Avtandil Semenovich Kakhniashvili, ulitsa Eliava, 37, kv. 41, Tbilisi; Ilia Solomonovich Kantor, Malo-Moskovskaya ulitsa, 31. kv. 45, Moscow; Vazha Venediktovich Dzhanelidze, prospekt Plekhanova, 140, Tbilisi; Alexandr Alexandrovich Lachinov, Zhivopismaya ulitsa, 12, kv. 19, Moscow, all of U.S.S.R.

[22] Filed: Mar. 9, 1971

[21] Appl. No.: 122,478

[30] Foreign Application Priority Data
   Mar. 18, 1971   U.S.S.R............................. 1411851

[52] U.S. Cl.................................... 243/33, 243/39
[51] Int. Cl...................... B65g 51/04, B65g 51/06
[58] Field of Search......................... 243/32, 33, 39

[56] References Cited
UNITED STATES PATENTS
| 595,890 | 12/1897 | Pike........................................ 243/38 |
| 590,181 | 9/1897 | Batcheller.............................. 243/39 |

FOREIGN PATENTS OR APPLICATIONS
| 1,246,584 | 8/1967 | Germany.............................. 243/32 |
| 1,198,739 | 8/1965 | Germany.............................. 243/33 |
| 1,532 | 5/1867 | Great Britain........................ 243/32 |

*Primary Examiner*—Evon C. Blunk
*Assistant Examiner*—W. Scott Carson

[57] ABSTRACT

A device for driving a train of containers through a pipeline in which a housing rests through trunnions on wheel trucks which support disks taking the pressure of the gas flow passing through the pipeline. The housing has an elastic sealing means closing the gap between the internal surface of the pipeline and the external surface of the housing.

2 Claims, 2 Drawing Figures

PATENTED JAN 22 1974　　　　　　　　　　　　　　3,787,007
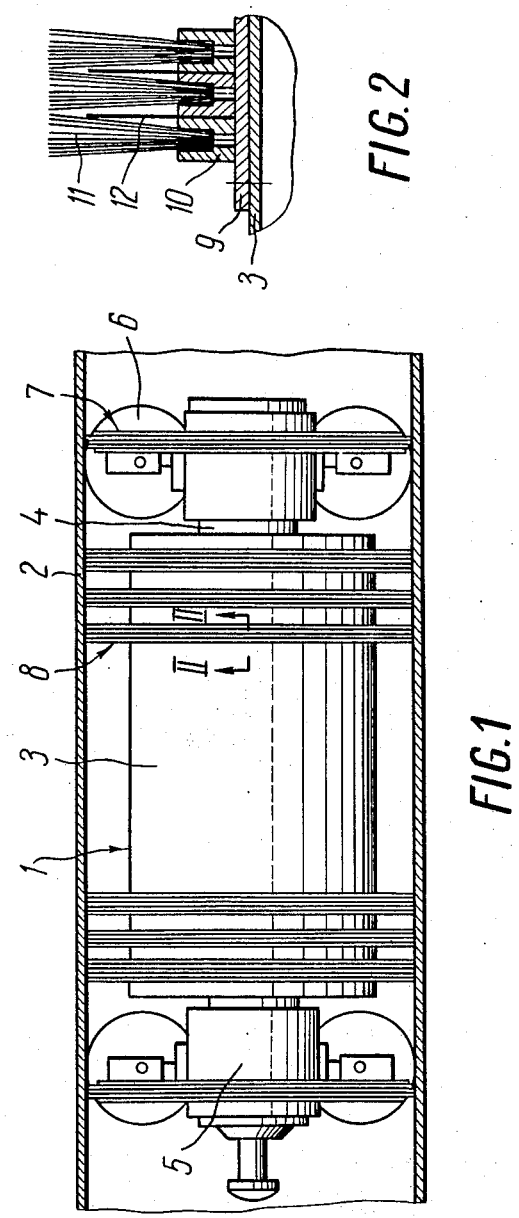

DEVICE FOR DRIVING TRAINS OF CONTAINERS THROUGH PIPELINE

BACKGROUND OF THE INVENTION

The present invention relates to devices for the pneumatic conveying of a load through a pipeline. More particularly, the invention relates to devices for driving a train of containers through a pipeline.

PRIOR ART

Known in the art are devices for driving containers through a pipeline under the effect of gas pressure. These devices have a cylindrical housing bearing on wheel trucks via trunnions. On the wheel trucks there are mounted disks so that the disks substantially close the cross section of the pipeline and have an outer diameter somewhat less than the inner diameter of the pipeline. The disks take the pressure of a gas flow introduced into the pipeline from a source of compressed gas and transmit the traction forces to the load containers connected with the device.

Due to the fact that in these prior devices there is a gap between the disks and the internal surface of the pipeline, considerable energy losses occur due to entry of a portion of the gas flow through the gap, particularly when the load is conveyed along an ascending portion of the track thereby resulting in a decrease in the speed of movement of the device and the associated load containers along the pipeline.

An object of the present invention is to provide a device for driving the containers having minimum energy losses during the movement of the device with the load containers through a pipeline under the action of gas pressure.

SUMMARY OF THE INVENTION

This object is attained by providing a device for driving a train of containers through a pipeline under the action of gas pressure comprising a cylindrical housing resting through trunnions on wheel trucks. To take the pressure of the gas flow passing through the pipeline, the wheel trucks are provided with disks closing the cross section of the pipeline and having an outer diameter which is somewhat less than the inner diameter of the pipeline. According to the invention, an elastic sealing means is mounted on the housing to close the annular gap between the internal surface of the pipeline and the external surface of the housing, with such sealing consisting of at least one annular holder on which there are mounted rings with filaments of elastic threads secured therein, and elastic gaskets being located between the rings to provide for a sealing between the filaments of the adjacent rings.

The present device for driving containers through pipelines under the action of gas pressure is simple in construction and expedient and reliable in operation.

The invention will be apparent from the following detailed description of one embodiment of the invention, reference being made to the accompanying drawings.

BRIEF DESCRIPTION OF THE DRAWINGS

FIG. 1 is a general view in elevation of the device for driving containers through a pipeline under the action of gas pressure, according to the invention and;

FIG. 2 is a view taken along line II—II in FIG. 1, the view looking in the direction of the arrows and being on an enlarged scale.

DETAILED DESCRIPTION OF THE INVENTION

The device 1 (FIG. 1) for driving a train of load containers (not shown) through a pipeline 2 is denated generally 1 and has a cylindrical housing 3 which, through trunnions 4 located on the opposite end walls 3a of the housing, bears on wheel trucks 5 provided with radially installed running wheels 6.

Mounted on the wheel trucks 5 are disks 7 closing the cross section of the pipeline 2 to take the pressure of the gas fed from a gas source (not shown). The disks 7 have an outer diameter which is somewhat less than the inner diameter of the pipeline 2. This is a necessary condition to enable the container driving device 1 to run along the pipeline 2 loosely and without any wear of the disks 7 providing that the pipeline 2 has permissible tolerances in the value of the inner diameter thereof.

Installed on the housing 3 adjacent to and inwardly of end walls 3a is an elastic sealing means 8 for closing the gap between the external surface of the housing 3 and the internal surface of the pipeline 2. The sealing means 8 consists of several annular holders 9 spaced axially of and (FIG. 2) rigidly secured on the housing 3.

Each annular holder includes a ring 10 of soft material, for example of aluminium, and in each ring 10 in a radial direction are secured filaments 11 of strong elastic threads, for example capron threads, defining a seal between the filaments of the adjacent rings 10. Elastic gaskets 12 are located between the rings 10 to provide a seal between the filaments of adjacent rings.

The device for driving a train of containers through a pipeline under the action of gas pressure operates as follows:

The device 1 is connected to a train of pivotally interconnected load containers (not shown), each having a cylindrical housing installed on wheel the pressure of the flow of compressed gas fed into the pipeline 2 from a source of compressed gas is taken by the disks 7 and the traction force is transmitted to the containers and the train moves in a prescribed direction.

The elastic sealing means 8 consisting of the several holders 9 provides for maximum reduction of the overflow of the compressed air due to the presence of the gap between the disks 7 and the internal surface of the pipeline 2, so that the energy losses during the movement of the device with the load containers through the pipeline 2 are reduced to minimum.

We claim:

1. A device for driving a train of containers through a pipeline under the action of gas pressure comprising in combination: a cylindrical housing having end walls; a trunnion located on each of the end walls of said housing: a wheel truck on which said cylindrical housing bears through each of said trunnions: disks mounted on each of said wheel trucks for closing the cross section of said pipeline to take the pressure of a gas flow passing through the pipeline, said disks having an outer diameter less than the inner diameter of said pipeline; and an elastic sealing means arranged on said housing adjacent each end thereof for closing the gap between the external diameter of said housing and internal diameter of said pipeline, said sealing means including at least one annular holder secured on said housing, a plurality of adjacent rings disposed on said holder, a plurality of filaments of wear resistant elastic threads secured on each ring and extending radially therefrom for engaging the internal diameter of the pipeline and elastic gaskets mounted on said holder between said rings providing a seal between said radially extending threads of the adjacent rings.

2. A device for driving a train of containers through a pipeline under the action of gas pressure comprising in combination: a cylindrical housing having end walls; a trunnion located on each end wall; a wheel truck on which said cylindrical housing bears through each of said trunnions; disks mounted on each of said wheel trucks for closing the cross section of the pipe line to take the pressure of a gas flow passing through the pipeline, said disks having an outer diameter less than the inner diameter of the pipeline; and an elastic sealing means arranged on the housing for closing the gap between the external diameter of the housing and the internal diameter of the pipe line, said sealing means including a plurality of axially spaced rows of radially extending wear resistant elastic filaments adjacent each end wall of the housing for engaging the internal diameter of the pipe line; and elastic gaskets mounted on the housing between the adjacent axially spaced rows of filaments providing a seal between the adjacent elastic filaments.

* * * * *